April 18, 1961      J. W. GRATIAN ET AL      2,980,905
RADIO RANGING DEVICE

Filed Dec. 16, 1948      3 Sheets-Sheet 1

WITNESSES:

INVENTORS:
Horace R. Crane
Marlan E. Bourns
Robert T. Nieset
Anne C. Gratian
Joseph W. Gratian
BY April 18, 1961     J. W. GRATIAN ET AL     2,980,905
RADIO RANGING DEVICE
Filed Dec. 16, 1948     3 Sheets-Sheet 2

WITNESSES:

INVENTORS:
Horace R. Crane
Marlan E. Bourns
Robert T. Nieset
Anne C. Gratian
Joseph W. Gratian April 18, 1961  J. W. GRATIAN ET AL  2,980,905
RADIO RANGING DEVICE
Filed Dec. 16, 1948  3 Sheets-Sheet 3

INVENTORS:
Horace R. Crane
Marlan E. Bourns
Robert T. Nieset
Anne C. Gratian
Joseph W. Gratian
BY
Roland A. Anderson
attorney WITNESSES:
Ralph Carlot Smith
Henry Heyman

United States Patent Office 2,980,905
Patented Apr. 18, 1961

2,980,905
RADIO RANGING DEVICE

Joseph W. Gratian and Anne C. Gratian, Rochester, N.Y., Robert T. Nieset, New Orleans, La., Marlan E. Bourns, Altadena, Calif., and Horace R. Crane, Ann Arbor, Mich., assignors to the United States of America as represented by the United States Atomic Energy Commission Filed Dec. 16, 1948, Ser. No. 65,697

6 Claims. (Cl. 343—13)

This invention relates broadly to a method and apparatus for effecting operations on a vehicle as a consequence of the approach to a selected intervening distance from another body. More particularly, it is directed to radio apparatus adapted to be carried on a vehicle for initiating a desired sequence of operations when the intervening space between the vehicle and a reflecting body is reduced to a selected value.

It is highly desirable in the operation of certain types of moving vehicles, such as aircraft for instance, that means be provided whereby the occurrence of a pre-selected value of proximity to the surface of the earth or other foreign body effects the actuation of warning lights or steering modifying apparatus. Other values on which the provision of such equipment is desirable to avoid collision are, for example, trains, ships and automobiles, in order that warning devices, reversed propulsion or brakes will be applied in the event the vehicle approaches within a selected minimum distance from an object.

More particularly, there are certain vehicles, such as projectiles, in which a provision of apparatus for initiating the sequence of operations upon the occurrence of a pre-selected value of proximity to another body is a necessity. For instance, certain types of free-falling projectiles containing explosive material are most effective if detonated at a pre-determined distance above the objective. The provision of apparatus for performing the above discussed functions on a vehicle is subject to certain requirements. The apparatus must possess accuracy, high sensitivity, compactness, lightness in weight and ruggedness.

The requirements as to lightness places a premium on minimizing the electric energization demand. In the case of small projectiles, the power supply must necessarily take the form of small batteries. It follows that such power limitations necessitate minimizing the number of electronic tubes to the least number which can give reliable performance.

The requirements as to compactness and ruggedness must be met by the selection of high working frequencies and the ultimate in simplicity of circuit design and fabrication.

The above discussed requirements as to the necessary characteristics of the apparatus for performing the present objectives result in the elimination of the radio detecting and ranging systems of the prior art. The elaborate provision of apparatus in either the amplitude pulsed transmitter-receiver or the frequency modulation system of the prior art mitigate against their application in solving the present problem.

It has been found that the super-regenerative oscillator has a characteristic which peculiarly adapts it for application in ranging apparatus which meets the above requirements.

This characteristic is the generation of oscillations of various lengths under free-running conditions of the super-regenerative oscillatory circuit; and the creation of uniform durations of oscillations under the condition that externally derived excitation of proper phase is impressed on the oscillatory circuit.

The above defined characteristic is utilized in ranging devices described in copending applications Serial No. 65,695, filed December 16, 1948, now abandoned, and Serial No. 65,696, filed December 16, 1948, of which applications the present disclosure is an improvement.

The super-regenerative oscillator is an oscillator circuit including a thermionic tube and a resonant circuit. In the self-quenching super-regenerative circuit, the tube is provided with a grid leak of such high value that the grid bias accumulated under oscillating conditions causes blocking after an interval of oscillation. The externally quenched super-regenerative circuit acts in a somewhat similar manner except that the termination of each oscillation is more precisely defined by the negative excursions of the quench wave.

After the tube is blocked and oscillations in the resonant circuit have collapsed, there is an interval of inaction during which the blocking bias on the grid is dissipated through the grid leak. After the grid potential has recovered to a value at which the building up of oscillations is again possible, the oscillations are begun, but only when the resonant circuit is given a small start. The small start may consist of either internally created thermal noise or excitation of proper phase from without. If there is no excitation from without the circuit and the thermal noise starts the process, there results a slight indefiniteness in the instant of birth of each succeeding oscillation. It follows that under the condition of termination of the oscillations at even intervals, the length of succeeding groups of oscillations are unequal.

The irregular starting of succeeding oscillations under the free-running condition is in marked contrast to the performance of the oscillator when the oscillations are started by externally derived excitation of proper phase and greater magnitude than thermal noise. Under the latter condition, the oscillations begin at regular intervals and are of longer duration.

The externally derived excitations for starting each succeeding oscillation after a uniform interval from the previous oscillation may be derived by directing energy from each preceding oscillation through a path having a length such that some of the energy is returned to the circuit at the proper instant to control a succeeding oscillation.

It follows that under the condition that the super-regenerative oscillator is provided with radiating and receiving means, it is capable of indicating the occurrence of that distance between itself and a reflecting object which so phases the received echo of energy of each emitted oscillation that the oscillations become longer and of uniform duration.

It has been found that the presence of increased length oscillations is evidenced by an increase in negative potential on the oscillator grid due to grid rectification over the increased period.

Therefore, as a device approaches a reflecting object, it passes through a zone in which the reflected energy causes an increase of the grid bias potential until the mid point of the zone is reached from which point the potential decreases.

It follows that the variation in potential created by grid rectification corresponding to ranging may be utilized to actuate a potential responsive device. For example, the potential variations are readily applied to a potential responsive switch such as a grid controlled gas discharge tube or thyratron in such manner as to cause conduction of the same upon the occurrence of a selected range.

It follows that a selected increase of the negative grid bias corresponding to a condition of on-range causes the gas discharge tube to become conductive and therefore results in the operation of any suitable current responsive device connected in series with the inter-electrode space. A ranging device constructed in accordance with the principles set forth in the foregoing discussion may be activated at uniform intervals, but better reliability under varying radiated power conditions is obtained by use of a sequence in which there are short and long intervals between activations in the manner explained in the referenced copending application Serial No. 65,696.

Therefore, it is an object of this invention to provide a simplified radio ranging device.

Another object of this invention is the provision of a super-regenerative ranging device.

Still another object is the provision of a super-regenerative ranging device which is compact, rugged and reliable in operation under extreme conditions of acceleration and vibration.

It is another object of this invention to provide a simplified radio ranging device for accurately indicating a selected range irrespective of variations in radiated power.

Another object of this invention is the provision of means in a simplified ranging device for effecting selected operations in response to the diminution of intervening distance to a pre-selected value between the device and a foreign body.

Still another object of this invention is the provision of super-regenerative apparatus adapted to generate an electric quantity in response to the occurrence of a selected intervening distance between the apparatus and an approaching body.

Another object of this invention is to provide switching means for initiating desired operations in response to the electric quantity generated by a super-regenerative device when the intervening distance between the device and a foreign body is a selected value.

Another object is the provision of a pulsed generator adapted to generate pulses alternately separated by short and relatively long time intervals.

Further objects and features of the invention will be more clearly understood from the following detailed description.

Figure 1–A shows a sequence of oscillations produced by a super-regenerative ranging device of the sine wave quenched type when not on range.

Figure 1–B shows the sequence of oscillations produced by a sine wave quenched super-regenerative ranging device when on range.

Figure 1:
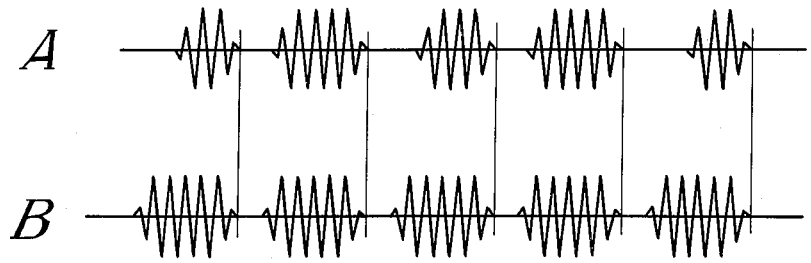

Referring to Figure 1, the distribution of radiation of a super-regenerative system quenched at equal intervals is shown. Short bursts of radiation of unequal length are generated when the device is not on-range as shown by Figure 1–A. In this condition, the oscillator grid bias assumes an average value depending on circuit constants. Upon the occurrence of the on-range condition, the short bursts of radiation are emitted at uniform intervals and have a longer duration as shown in Figure 1–B. The reason for this is that the echo of a preceding burst of radiation is received back at the device in proper phase to start a succeeding oscillation earlier than that effected by thermal agitation. Under this condition, the oscillator grid bias is increased. Therefore, as the device closes in distance between itself and a reflecting object, a series of oscillator grid bias increases are obtained as the device passes through those distances which control some succeeding oscillation.

Figure 2:
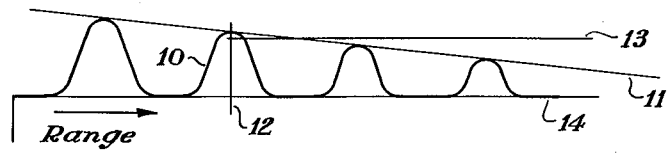
Figure 2 is a chart illustrating the occurrence of increases in oscillator grid bias potential with respect to range obtained with a ranging device which radiates in the manner of Figure 1.

The negative potential which results from oscillator grid rectification has lobes which correspond to the basic range and multiples of the basic range as shown in Figure 2. The amount of increase of grid bias depends upon the strength of the echo returned to the equipment for the reason that the strength of the echo is a factor which influences the birth of succeeding oscillations. Therefore, since the strength of the echo is a function of the amount of power radiated and the distance through which the radiated power travels, the extent of increase of grid power potential is likewise a function of radiated power and distance.

Under a condition of constant radiated power the series of oscillator grid potential increases are obtained as shown by curve 10 in Figure 2. The average non-ranging bias is indicated by reference line 14. It is to be noticed that the rate of decrease of the maximum values of succeeding grid bias potentials is substantially a constant as shown by the straight line 11.

It is assumed for purposes of explanation that the device is adjusted to respond at the range indicated by numeral 12. To this end, the potential responsive device which may be a thyratron, is provided with suitable operating potentials such that the oscillator grid bias applied thereto causes conduction when it rises above the firing level indicated by line 13.

It follows that under the condition shown in Figure 2 that as the device closes in range toward an objective, a sufficient increase in oscillator bias potential to permit the thyratron to fire occurs only when the device encounters selected range 12. Therefore, under the condition of constant radiated power, the described ranging device is capable of accurately triggering the switching device as it encounters the selected range in closing in on a reflecting object.

Figure 3:
Figure 3 is a chart of oscillation sequence produced by the preferred embodiment when on range.

In order to eliminate the possibility of erroneous indications due to bias potential increases at even multiples of the basic range in the event the radiated power varies, it is preferred to arrange the device so that a sequence of oscillations separated alternately by long and short intervals are produced. The preferred sequence is as shown in Figure 3. The first oscillation of each pair is indicated by the numeral 16. This burst of oscillation is termed the sending oscillation for the reason that it is radiated and it is its echo which returns in proper phase from an object at the selected range to control the birth and therefore regularity of the second oscillation indicated by numeral 17. The potential created by grid rectification during the second oscillation of each pair fluctuates about a given average level when the device is off-range and increases in value when the device is on-range. Therefore, the second of the paired oscillations is termed the sensing oscillation. On range, the interval between an early part of the sending oscillation and the beginning of the sensing oscillation is substantially equal to the time consumed by the sending oscillation radiation in travelling to and from the reflecting object and, therefore, this interval is termed the ranging interval. The interval between succeeding sending oscillations is termed the repetition interval.

Figure 4:
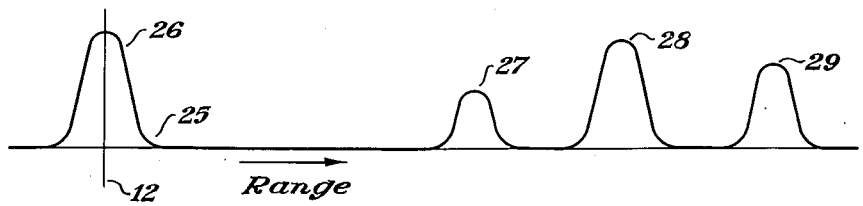
Figure 4 is a chart showing the occurrence of increases in oscillator grid potential with respect to range as obtained in the preferred embodiment.

Referring to Figure 4, the rectified grid potential derived from the paired oscillation system thus far described is shown by curve 25. The grid bias increase corresponding to a selected range 12 is shown by lobe 26. Additional grid potential increases 27, 28 and 29 are obtained at ranges which are long with respect to the selected range due to the concurrence at the device of the reflections of preceding emissions in proper time phase with later emissions. These grid potential increases occur at distances so far removed from the selected range that confusion with the indication of the true range is easily avoided.

Figure 5:
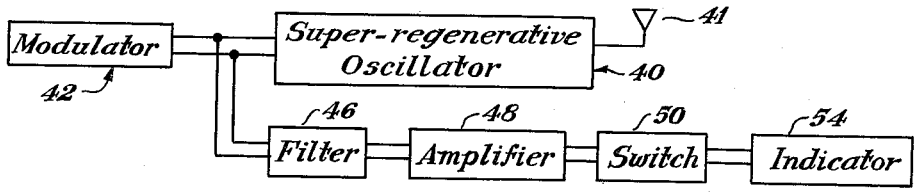
Figure 5 is a block diagram of the preferred embodiment of the ranging system.

The organization of parts in a preferred embodiment is illustrated in block form in Figure 5.

The signal emitter and echo sensing device is a super-regenerative oscillator 40 having an antenna 41 coupled to the oscillatory circuit. The oscillator is activated for oscillation by the generation by modulator 42 of modulation pulses spaced alternately by a ranging interval and a repetition interval.

To the end that a desired indication or operation will be produced by the ranging device, the increases in grid bias generated by the oscillator in the on-range condition is passed through filter 46, processed in amplifier 48 and applied to switch 50. An indicator 54 is coupled to switch 50 whereby an indication is given responsive to actuation of switch 50.

The ranging device of the present invention will now be described in detail and to the end that a succinct description of the several components will be given, the components are individually considered in the order written in the preceding paragraphs.

Figure 6:
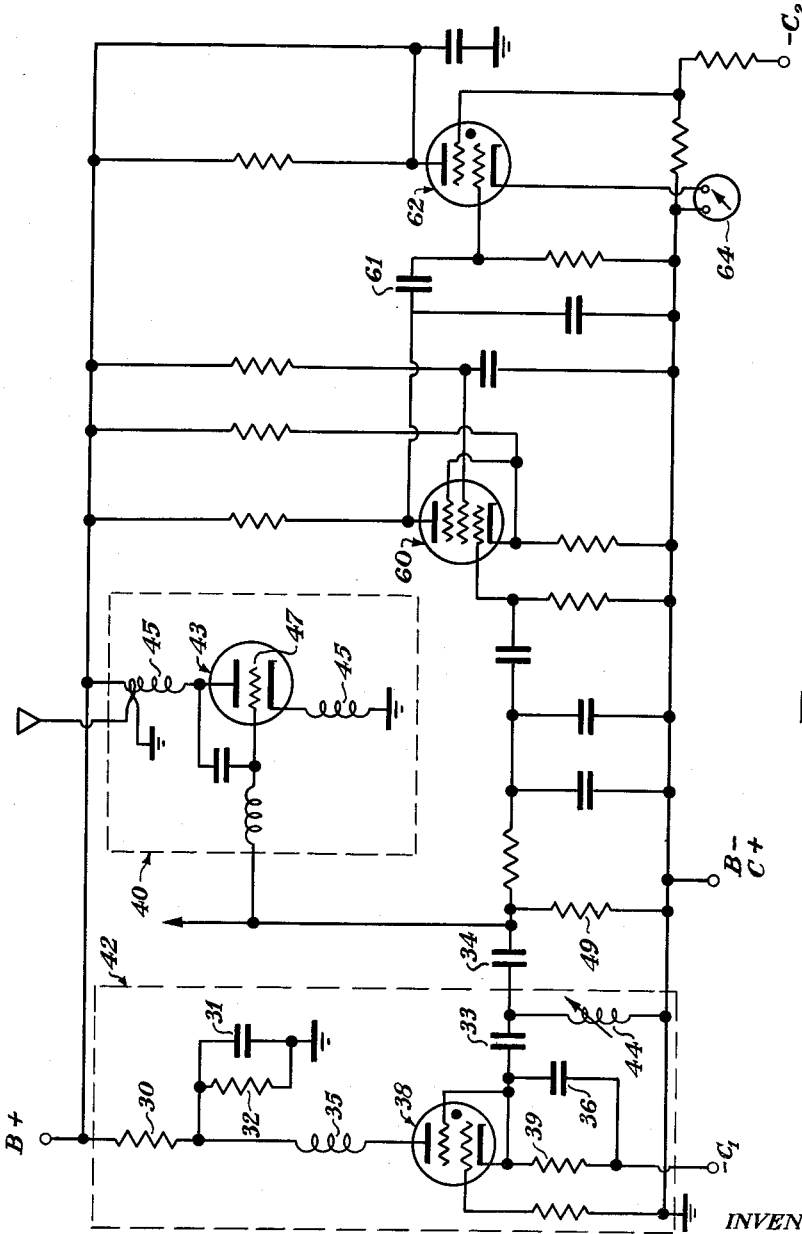
Figure 6 is a schematic diagram of the circuits in the preferred embodiment.

Referring to Figure 6, the super-regenerative detector-oscillator hereinafter termed the power oscillator for purposes of brevity is indicated generally by numeral 40. The power oscillator utilizes a triode 43 in an oscillator circuit of the Colpitts type. Tank inductances 45 are connected in the cathode and anode circuits and are proportioned in accordance with the selected working frequency. The grid 47 is provided with a grid leak resistance 49 and modulation input condenser 34.

Positive pulses are derived from modulator 42 in a manner later to be described and are impressed on the input coupling condenser. Under the influence of the positive pulses and positive excursions of the grid during oscillation, grid rectification takes place and provides the negative bias necessary to keep the oscillator tube 43 well below cut-off between modulation pulses. To this end, the product of the grid resistance 49 and associated capacitance including coupling condenser 34 is proportioned to provide a time constant somewhat longer than the interval between oscillations.

The power oscillator is released to start each oscillation by the cancellation of the negative grid bias by positive modulation pulses, and is abruptly stopped at the termination of the modulation pulse by the high negative charge accumulated on the grid in the manner previously described.

For example, a 955 type triode utilized as an oscillator generally has a value of cut-off bias equal to approximately minus 22 volts under a condition of 250 volts on the anode. In order that the oscillator will stop abruptly, it is necessary that the grid be impressed with a bias which is approximately 10 volts more negative than the cut-off value. To permit the start of an oscillation, the bias must be reduced substantially to zero. Under these conditions, the modulator pulses are required to have a peak value in the neighborhood of 35 volts positive. If the modulation pulses obtain a higher value of positive peak voltage than that required, the power oscillator grid simply draws more grid current and thereby automatically increases the grid bias. On the other hand, the modulation pulses must not be less than a minimum value which is approximately 35 volts in the above example for the reason that erratic starting and quenching of the power oscillator is the consequence.

The duration between the early part of one oscillatory period and the instant of birth of a succeeding oscillation determines the distance of ranging in accordance with the relation $$T_r = \frac{2D \text{ max}}{C}$$

wherein $T_r$ is the ranging interval, D max is the maximum distance at which ranging occurs, and C equals the velocity of light.

The shortest ranging interval for the circuit must be at least equal to the duration of the sending pulse plus the time consumed by the energy in the oscillatory circuit to decay below the thermal noise level.

The decay time in terms of circuit Q is expressed by the relation $$t = \frac{Q}{\pi f} \log \frac{E \text{ max}}{E \text{ noise}}$$

in which E max is the power oscillator voltage and E noise is the thermal noise level of the circuit.

Therefore, if the length of the sending pulse is denoted by $t_s$ the relation between the ranging interval and the circuit parameters is stated thus $$T_r = \frac{2D \text{ max}}{C} > \frac{Q}{\pi f} \times \log \frac{E \text{ max}}{E \text{ noise}} + t_s$$

E noise for a circuit of the present type is determined from the equation $$V^2 = \frac{KT}{C}$$

wherein $V^2$ is the root mean square noise voltage, K is Boltzmann's constant $1.37 \times 10^{-28}$ joules per degree absolute, T is the absolute temperature in degrees Kelvin and C is the capacitance in the circuit.

In accordance with the above relations, circuit values may be chosen to so limit the decay time of oscillation with respect to the ranging interval that the device can be adapted to indicate any selected range within practical limits.

The modulator 42 is a simple arrangement for generating pairs of pulses spaced from one another by an interval longer than the interval between the pulses of each pair. The arrangement comprises a gas tube 38 operating as a conventional relaxation oscillator. The tube is provided with a cathode resistor 39. Anode potential is supplied through a resistor 30 which charges condenser 31 in the anode circuit. Condenser 31 is connected to the anode of tube 38 through an inductance 35 for reasons later to become apparent. During the quiescent interval between ranging periods, i.e., the repetition interval, condenser 31 becomes charged to a potential such that tube 38 fires. Condenser 31 becomes discharged after a very short duration and tube 38 is thereby extinguished in the usual manner. During conduction of the tube, the steep positive rise in voltage across cathode resistor 39 is fed through a small coupling condenser 33 to an L-C tank circuit comprising the inductance 44, capacitance including that of small cathode by-pass condenser 36, coupling condenser 33 and distributed capacitance. Oscillations are thus initiated in the tank circuit and are coupled to the oscillator as grid modulating pulses.

The spacing between pulses corresponds to the ranging interval and is adjusted to the selected value by the selection of appropriate values of inductance and capacitance.

The drop in amplitude between pulses two and three may be explained as follows: On the first pulse, the thyratron pulse drives the tank circuit, but it also supplies directly the energy required to charge the coupling condenser when the oscillator grid is driven positive. On the second pulse, however, energy is supplied only from the energy stored in the tank circuit. The depletion of the energy in the tank circuit by the second pulse results in the rapid attenuation of subsequent oscillations. It follows that the grid is biassed so far negative by the first and second pulses that subsequent pulses are unable to drive the grid positive.

Upon ranging, the oscillator creates a negative potential which has a rise and fall having a period corresponding to the rate of approach of a device to a reflecting body. For instance, a ranging device having a ranging pulse width of 100 feet and a velocity of approximately 800 feet per second, creates a variation in grid bias which has a frequency of approximately four cycles per second. This variation in grid bias is passed through the low-pass filter 46 and is then impressed on amplifier tube 60. Limiting the band pass in this manner prevents saturation of the amplifier due to the quench frequency and microphonic noises. The variation in grid bias potential is coupled through condenser 61 to thyratron 62. The potential applied to thyratron 62 is reversed in phase by amplifier tube 60 and is therefore positive in direction. Thyratron 62 is supplied with appropriate potentials so that upon the occurrence of the selected range, the tube becomes conductive.

It follows from the foregoing that the tank circuit which is shock excited by the gas tube is proportioned to have a natural period equal to the ranging interval. Resistances 30 and 32, and condenser 31 are proportioned to provide the repetition interval.

The modulator thus far described has the unusual characteristic of generating two cycles of high amplitude after which the oscillations are severely damped. It is desirable that the amplitude of the first pulse be not appreciably greater than that of the second in order that the bias developed by the oscillator grid will not be greater than the amplitude of the second pulse. Reduction in amplitude of the first pulse relative to the remainder of the oscillations is accomplished by the reaction of choke 35 in the anode circuit of the gas tube. The value of this choke is not critical and it is only necessary that it have a period which is appreciably shorter than that of the L–C circuit. The effect of the peak value of the first pulse is further reduced by selecting a time constant of the coupling condenser 34 and the effective grid resistance when the grid is positive which is large compared with the pulse width and, consequently, the oscillator grid bias developed after the first pulse is considerably less than the peak amplitude of the first pulse.

Figure 7:
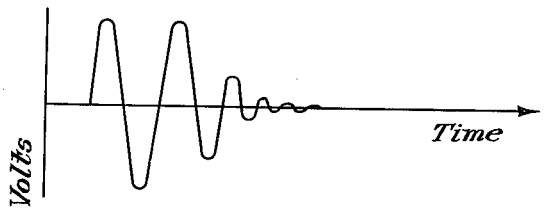
Figure 7 is a curve showing the double pulsed modulation as used in the preferred embodiment.

Figure 7 shows the modulator output oscillations as applied to the grid of the oscillator. It will be noticed that there is a large drop in amplitude between the second and third pulses after which the decay is exponential. After the second pulse, the oscillator grid is biassed negative to a voltage which is only slightly less than the amplitude of the first and second pulses. Therefore, the greatly reduced third pulse is unable to activate the oscillator a third time.

The gas tube or thyratron 38 in the modulator shown in Figure 6 is capable of shock exciting the tank circuit in its cathode circuit in the manner above described but the gas tube is subject to severe operation conditions. The superposition of a damped pulse from the tank circuit on the normal cathode sawtooth voltage causes a cathode to filament voltage which may exceed the cathode to filament tolerance voltage of some gas tubes.

Figure 8:
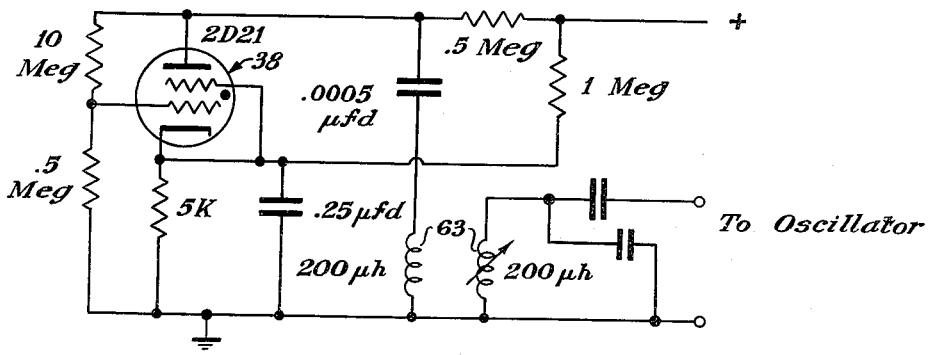
Figure 8 is a schematic showing of a second embodiment of the double pulsed modulator.

To the end that stress on the cathode to filament insulation will be kept to a low value, a modification of the modulator circuit is shown in Figure 8. The relaxation circuit is in the anode circuit. The pairs of modulation pulses are generated in tank coils 63 by shock excitation by coupling to the relaxation circuit. The constants given in the circuit provide a repetition rate of approximately 4000 cycles per second and a spacing between pulses of each pair of one microsecond.

The modulator is coupled to the super-regenerative oscillator and activates it upon the occurrence of the positive half cycle of each of the first two oscillations. The term activation as herein used means the removal of blocking grid bias so that the oscillator tube is in condition to oscillate.

In order that the occurrence of the on-range condition will result in the initiation of either an indication or a selected series of events, a current responsive device 64 is inserted in series with the cathode of thyratron 62. In the case of a detonating fuse or squib, the fuse or squib is connected directly in series with the cathode. In the event that the indicating device is a relay actuating coil or other contiguous load, it may be desirable to limit the duration of conduction for a selected period. An appropriate arrangement for achieving this end is described in the above referenced copending application Serial No. 65,696.

Although the invention has been described with reference to certain specific embodiments, other modifications are possible. Therefore, the invention is to be restricted only by the appended claims as interpreted in view of the prior art.

What is claimed is:

1. A radio ranging device comprising means adapted to radiate short bursts of radio frequency energy and to indicate the receipt of radio frequency energy, means for rendering said first mentioned means normally quiescent, modulator means for activating said first mentioned means in successively alternate modes, one of said modes being two activations with an intervening ranging time interval equal substantially to twice the selected ranging distance divided by the velocity of light and the second mode being the repetition of said two activations with a time interval longer than said first time interval; said modulator means comprising a relaxation oscillator including a gas tube having at least a cathode and an anode, and a tank circuit; said relaxation oscillator having a normally quiescent period equal to the aforementioned longer time interval, said tank circuit having a period equal to the aforesaid ranging time interval and being coupled to the said cathode whereby it is shock excited at its natural period, said tank circuit being coupled to the first mentioned means whereby said first mentioned means is activated by the positive half cycles of the excitations in said tank circuit.

2. A radio ranging device comprising a super-regenerative oscillator circuit having transmitting and sensing phases of operation and comprising a thermionic tube having at least a grid, said grid being adapted to generate a potential for biassing said oscillating circuit normally into quiescence, modulator means for neutralizing the biassing potential on said grid by impressing a first activating pulse on said oscillator for transmitting, and a second pulse spaced in time from the first pulse by the ranging interval for activating said oscillator for sensing; said modulator means comprising a resonant circuit having a period equal to the said ranging interval and means for shock exciting said resonant circuit whereby the positive half cycles of the oscillatory potentials in said tank circuit are impressed on the grid of the super-regenerative oscillator circuit to thereby activate the same.

3. In combination with a super-regenerative ranging device having periods of action spaced alternately by long and short intervals; a modulator comprising a relaxation circuit including a gas tube, and a tank circuit, said relaxation oscillator having a repetition period equal to the said long interval and said tank circuit having a resonant period equal to the said short interval, means coupling the said tank circuit to the relaxation oscillator whereby said tank circuit is shocked into oscillations at its natural period by each oscillation of the relaxation oscillator, means for limiting the amplitude of the first oscillation in the tank circuit comprising an inductance connected in series with the inter-electrode space of said gas tube, and means in said super-regenerative oscillator for absorbing energy from said tank circuit whereby the oscillations therein subsequent to the second oscillation decrease at an exponential rate whereby the amplitude of the same are insufficient to modulate said super-regenerative oscillator after the second oscillation.

4. In combination a super-regenerative ranging device including an oscillatory tube and having periods of action spaced alternately by long and short intervals; a modulator comprising a relaxation circuit including a gas tube having at least a cathode, and a tank circuit; said relaxation oscillator having a repetition period equal to the said long interval and said tank circuit having a resonant period equal to the said short interval, means coupling the said tank circuit to the cathode of the relaxation oscillator whereby said tank circuit is shocked into oscillations at its natural period by each oscillation of the relaxation oscillator, means for coupling said tank circuit to the oscillatory tube of said super-regenerative ranging device including a capacitor, means for limiting the amplitude of the first oscillation in the tank circuit comprising an inductance connected in series with the inter-electrode space of said gas tube, and means in said super-regenerative oscillatory tube for absorbing energy from said capacitor whereby the absorption of energy from said tank circuit by said capacitor subsequent to the first oscillation therein causes a decrease in amplitude of the oscillations therein to below the modulation level subsequent to the second oscillation.

5. In combination a super-regenerative ranging device including an oscillatory tube and having periods of action spaced alternately by long and short intervals, a modulator comprising a relaxation circuit including a gas tube having at least an anode, and a tank circuit; said relaxation oscillator having a repetition period equal to the said long interval and said tank circuit having a resonant period equal to the said short interval, means coupling the said tank circuit to the anode of the relaxation oscillator whereby said tank circuit is shocked into oscillations at its natural period by each oscillation of the relaxation oscillator, means for coupling said tank circuit to the oscillatory tube of said super-regenerative ranging device including a capacitor, means for limiting the amplitude of the first oscillation in the tank circuit comprising an inductive reactance connected serially with the inter-electrode space of said gas tube, and means in said super-regenerative oscillatory tube for absorbing energy from said capacitor whereby the absorption of energy from said tank circuit in charging said capacitor subsequent to the first oscillation of the said tank circuit causes a decrease in amplitude of the oscillations therein subsequent to the second oscillation whereby only the first two oscillations have sufficient amplitude to activate said oscillatory tube.

6. A radio ranging device comprising a super-regenerative oscillator circuit having transmitting and sensing phases of operation and comprising a thermionic tube having at least a grid, said grid being adapted to generate a potential for biassing said oscillating circuit into quiescence, modulator means for neutralizing the biassing potential on said grid by impressing a first activating pulse on said oscillator for transmitting, and a second pulse spaced in time from the first pulse by a ranging interval for activating said oscillator for sensing; said modulator means comprising a resonant circuit having an adjustable period whereby the ranging interval is adjustable, and means for shock exciting said resonant circuit whereby the positive half cycles of the oscillatory potentials in said tank circuit are impressed on the grid of the super-regenerative oscillator circuit to thereby activate the same.

References Cited in the file of this patent

UNITED STATES PATENTS

| | | |
|---|---|---|
| 2,288,554 | Smith | June 30, 1942 |
| 2,415,093 | Gerwin | Feb. 4, 1947 |
| 2,422,382 | Winchel | June 17, 1947 |
| 2,428,799 | Hayes et al. | Oct. 14, 1947 |
| 2,431,344 | Reeves | Nov. 25, 1947 |
| 2,443,619 | Hopper | June 22, 1948 |

FOREIGN PATENTS

| | | |
|---|---|---|
| 581,982 | Great Britain | Oct. 31, 1946 |